US006666469B2

United States Patent
Yu et al.

(10) Patent No.: US 6,666,469 B2
(45) Date of Patent: Dec. 23, 2003

(54) AUXILIARY DEVICE OF MONOCYCLE

(76) Inventors: Chih Wang Yu, 235 Chung-Ho Box 8-24, Taipei (TW); Chih Yung Yu, 235 Chung-Ho Box 8-24, Taipei (TW)

( * ) Notice: Subject to any disclaimer, the term of this patent is extended or adjusted under 35 U.S.C. 154(b) by 2 days.

(21) Appl. No.: 10/046,037

(22) Filed: Jan. 15, 2002

(65) Prior Publication Data
US 2003/0132599 A1 Jul. 17, 2003

(51) Int. Cl.$^7$ .................................................. B62K 1/00
(52) U.S. Cl. ...................................... 280/274; 280/205
(58) Field of Search ............................... 280/274, 205, 280/266, 282

(56) References Cited

U.S. PATENT DOCUMENTS 524,019 A * 8/1894 Desmond
2,950,127 A * 8/1960 Phillips ....................... 280/304
3,860,264 A * 1/1975 Douglas et al. ............. 280/266
4,657,272 A * 4/1987 Davenport ................... 280/266
4,863,182 A * 9/1989 Chern .......................... 280/266

* cited by examiner

Primary Examiner—Lesley D. Morris
Assistant Examiner—Tony Winner

(57) ABSTRACT

An auxiliary device of a monocycle has an auxiliary body connected to a monocycle. The main fork of the monocycle has a main sleeve. A detachable auxiliary body is connected to the main sleeve. Thereby, the auxiliary body can be installed to or detachable from the monocycle. The auxiliary body is mainly formed by a front head and a frame tube. The front head has a handle frame, a sub-wheel body and a sub-fork. The frame tube is connected to the monocycle. A front end of the monocycle is installed with a sub-sleeve which is formed at an upper end of the sub-fork so as to be formed as a monocycle with an auxiliary wheel.

9 Claims, 7 Drawing Sheets

AUXILIARY DEVICE OF MONOCYCLE

FIELD OF THE INVENTION

The present invention relates to monocycles, and particularly to an auxiliary device of a monocycle having an auxiliary body which can be connected to a main fork of a monocycle so that one studying to drive a monocycle can improve the studying effect.

BACKGROUND OF THE INVENTION

More and more peoples drive monocycles as an exercise. Driving monocycle has been a course in some schools in Japan. However, many people have studying obstacles in studying driving a monocycle since to balance a monocycle is very difficult for a new student. However, most of people can drive a bicycle easily. Thus, there is an eager demand for the user to study the monocycle easily by using the experience of driving a bicycle.

SUMMARY OF THE INVENTION

Accordingly, the primary object of the present invention is to provide an auxiliary device of a monocycle having an auxiliary body connected to a monocycle. The main fork of the monocycle has a main sleeve. A detachable auxiliary body is connected to the main sleeve. Thereby, the auxiliary body can be installed to or detachable from the monocycle. The auxiliary body is mainly formed by a front head and a frame tube. The front head having a handle frame, a sub-wheel body and a sub-fork. The frame tube is connected to the monocycle. A front end of the monocycle is installed with a sub-sleeve which is formed at an upper end of the sub-fork so as to be formed as a monocycle with an auxiliary wheel.

The various objects and advantages of the present invention will be more readily understood from the following detailed description when read in conjunction with the appended drawing.

DETAILED DESCRIPTION OF THE PREFERRED EMBODIMENTS

Figure 1:
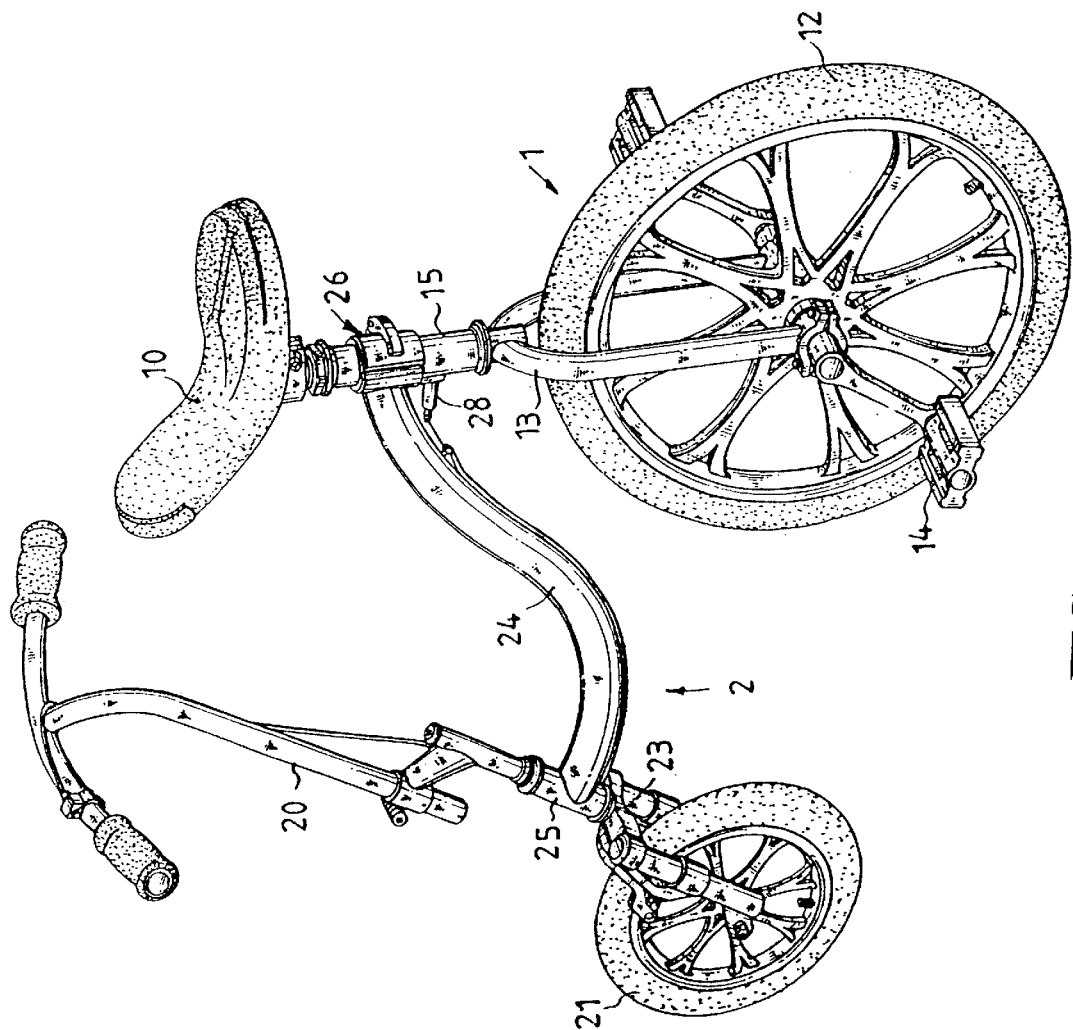
FIG. 1 is a perspective view of the present invention.

Referring to FIG. 1, the monocycle driving auxiliary device of the present invention is illustrated. The monocycle driving auxiliary device is mainly formed by an auxiliary body 2 which is installed at a front end of a monocycle so as to be formed as a bicycle. The monocycle 1 is has a stand tube 11 with a seat cushion 10. The stand tube 11 is engaged with a main fork 13 of a main wheel body 12. Two treads are arranged at two sides of the main wheel body 12. The upper tube 131 of the main fork 13 is enclosed by a main sleeve 15. The main sleeve 15 is used to connect the auxiliary body 2. The auxiliary body 2 is mainly formed by a front head and a frame tube 24. The front head has a handle frame 20, a sub-wheel body 21 and a sub-fork 23. The frame tube 25 has a sub-sleeve which is connected to the sub-fork upper tube 231. The rear end of the auxiliary body 2 is a clamping seat 26. The clamp seat 5 is clamped and fixed to the main sleeve 15 of the monocycle 1 so as to form a simple bicycle structure.

Figure 2:
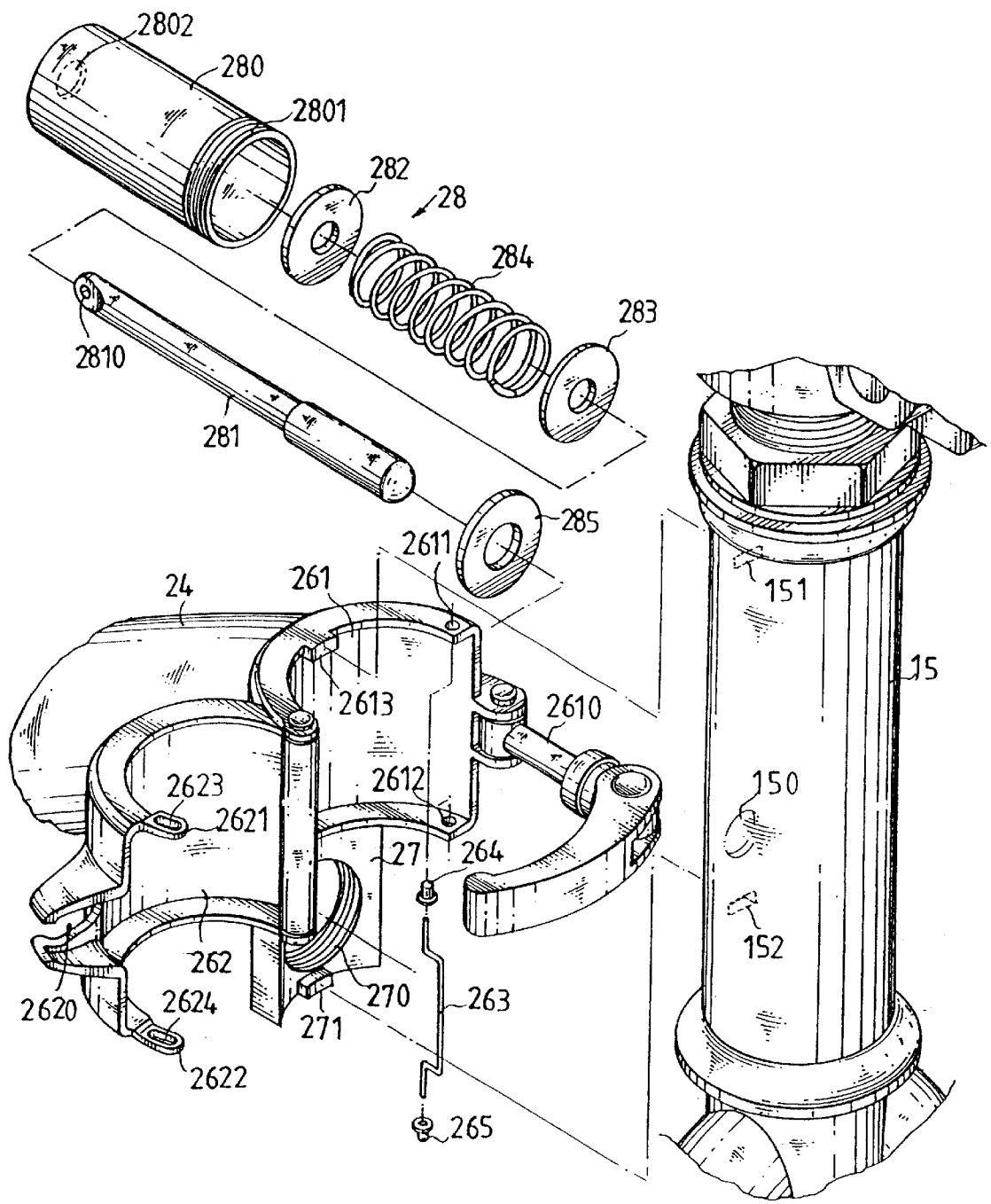
FIG. 2 is an exploded schematic view of the present invention.
Figure 3:
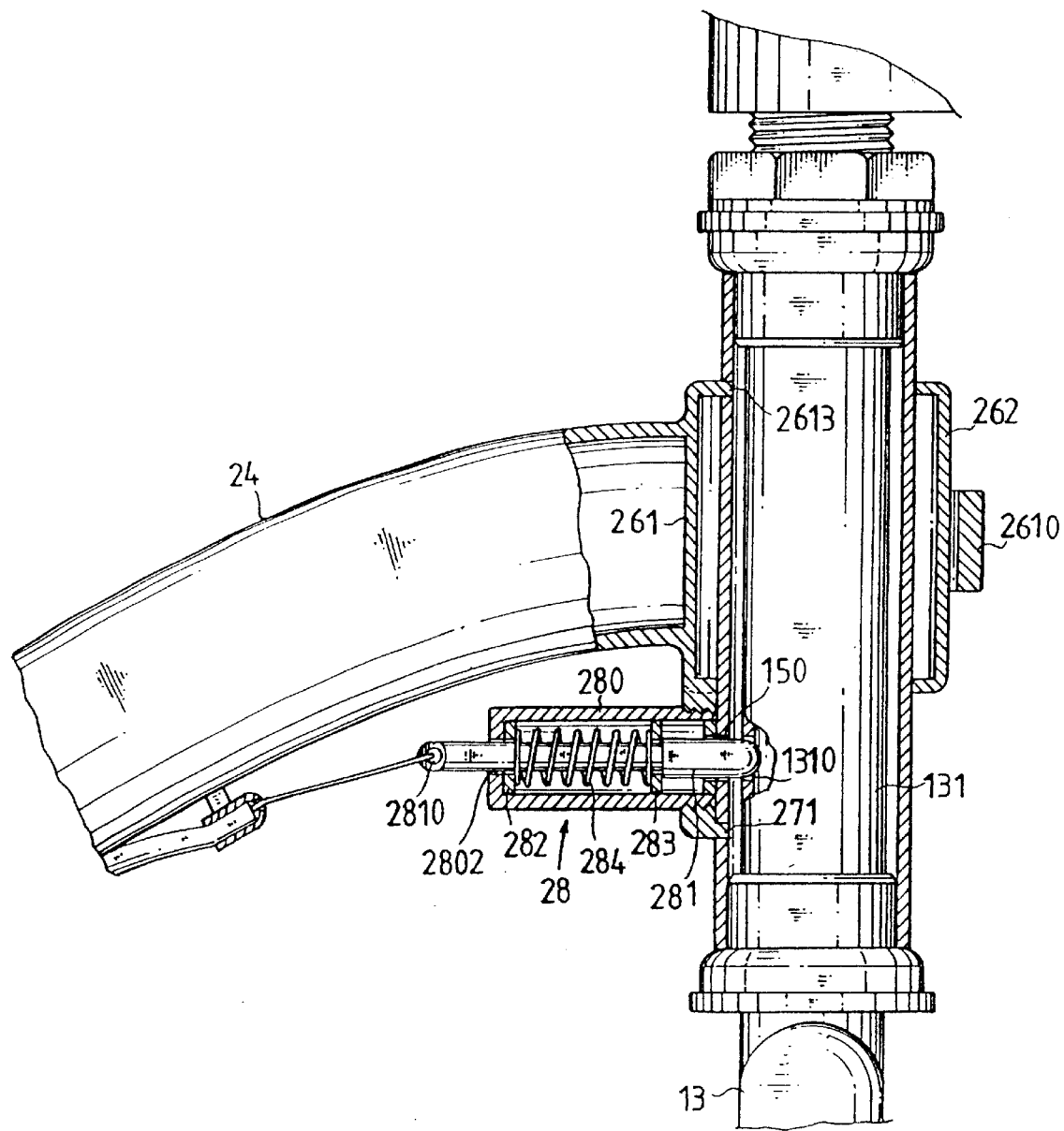
FIG. 3 is a partial assembled cross sectional view of the present invention.
Figure 4:
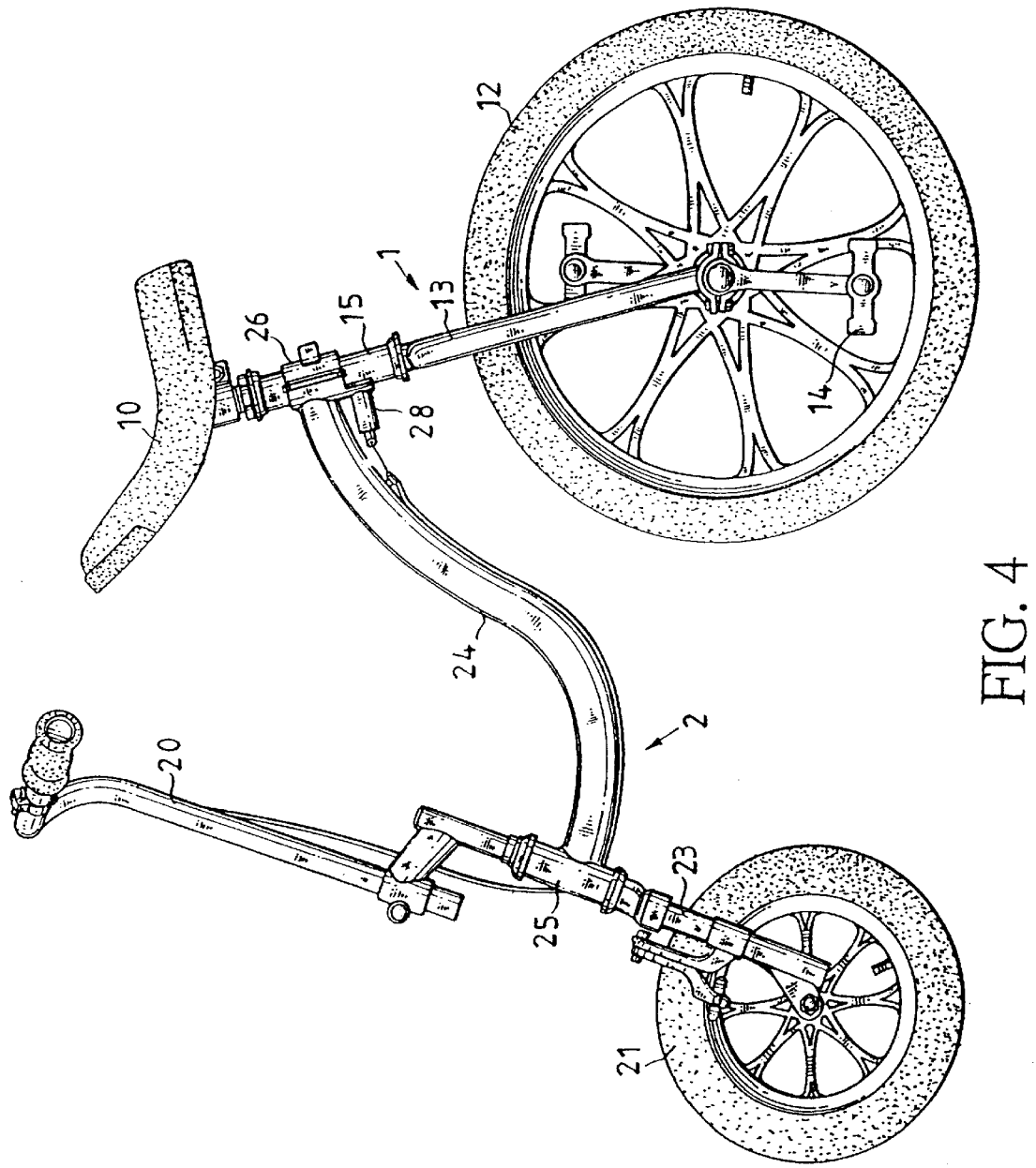
FIG. 4 is a lateral assembled view of the present invention.
Figure 5:
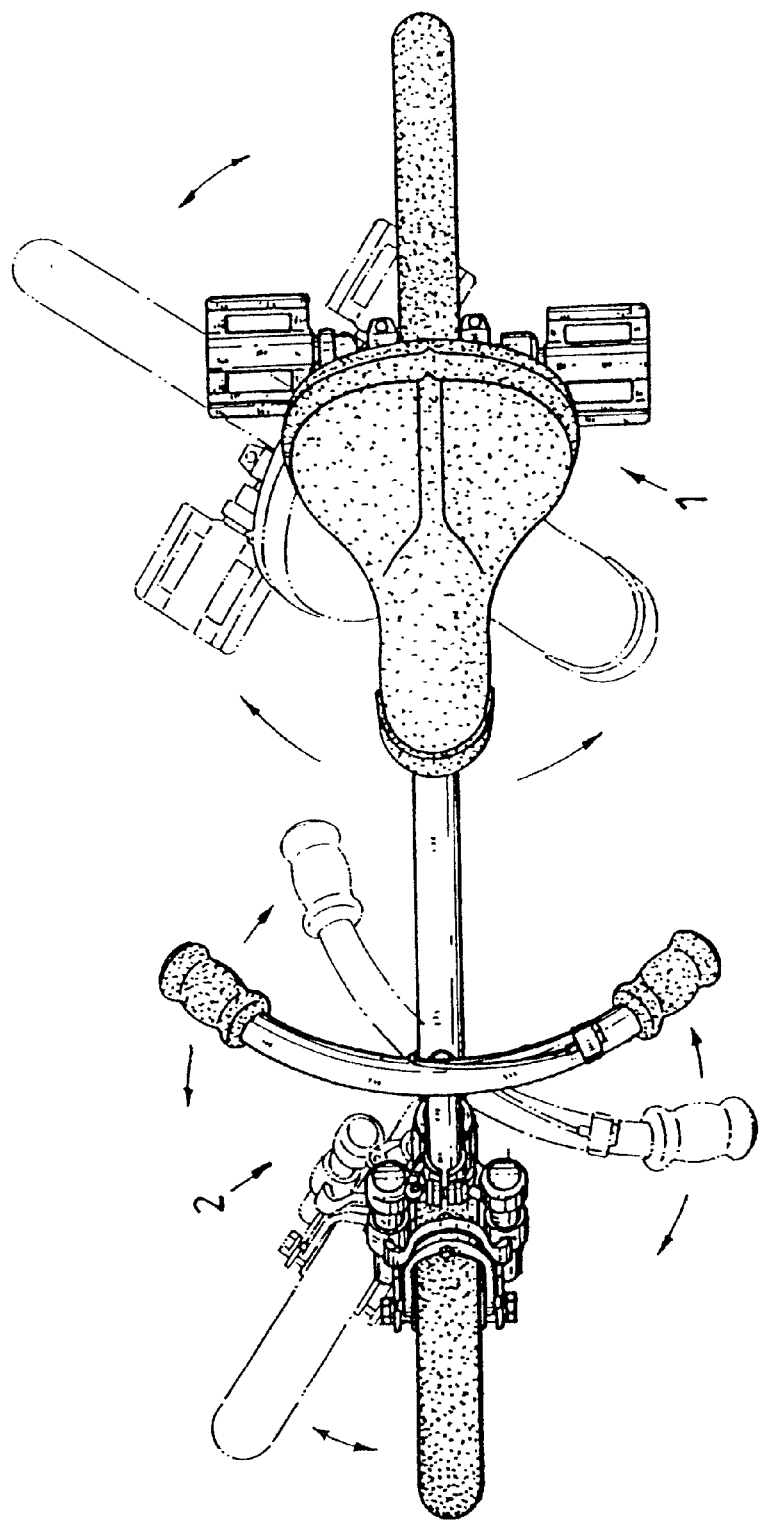
FIG. 5 is a schematic view of the present invention.

Referring to FIGS. 2 and 3, an exploded view and assembled cross sectional view of the monocycle 1 positioned at the distal clamping seat 26 of the frame tube 24 of the auxiliary body 2 are illustrated. The clamping seat 26 is formed by two half cylinders 261, 262 which are pivotally connected to one another. One half cylinder 261 is firmly secured to the distal end of the frame tube 24 so that the frame tube 24 is inserted into a quick detaching stud 2610 pivotally installed to another half cylinder 261 by a flange of a buckling groove 2620 of a half cylinder 262. Thereby, the two half cylinders 261, 262 clamps the pivotal main sleeve 15 of the monocycle 1. The upper and lower folded edges at the locking ends of the two half cylinders 261, 262 are installed with respective safety devices which are engagable with one another. The outer ends of the upper and lower folded edges of the half cylinder 261 have respective openings 2611, 2612. An elastic strip passes through the two openings 2611, 2612, and two ends of the elastic strip are engaged by respective positioning nuts 264, 265. The outer ends of the upper and lower folded edges of the half cylinder 262 have respective buckles 2621, 2622. The buckles 2621, 2622 have respective buckle holes 2623, 2624. The buckle holes 2623, 2624 are corresponding to the openings 2611, 2612, respectively. Therefore, as the two half cylinders 261, 262 are locked together, the buckles 2621, 2622 are exactly locked into the positioning nuts 264, 265 so that the quick detaching stud 2610 and the buckling groove 2610 will not become loose and thus are detached. Furthermore, the half cylinder 261 firmly secured to the frame tube 24 is welded with a positioning block 27 at the lower side thereof. The positioning block 27 has a threaded hole 270. The positioning block 27 has a positioning device 28 which is formed by an outer sleeve 280, a positioning pin 281, two washers 282, 283, a spring 284, and an outer sealing piece 285. Outer threaded portion 2810 are formed at one outer side of the outer sleeve 280 which is utilized to be connected with the threaded hole 270 of the positioning block 27. Another end of the outer sleeve 280 has an axial hole 2802. The positioning pin 281 can pass through the axial hole 2802. One end of the positioning pin 281 for penetrating through the outer sleeve 280 has a radial hole 2810. An adjustable steel wire may be connected to the radial hole and then the positioning pin 281 is pulled. Another end of the positioning pin 281 is a larger post so that when the positioning pin 281 is installed in the outer sleeve 280. The smaller post of the positioning pin 281 can be enclosed by two washers 282, 283. The spring 284 is installed between the two washers 282, 283. An outer sealing piece 285 serves to seal one end of the outer sleeve 280. A center of the outer sealing piece 285 has a penetrating hole 2850 which may be passed through by the larger post of the positioning pin 281. In normal condition, the positioning pin 281 suffers from a resisting force from the spring 284. The main sleeve 15 has a through hole 150 at a position corresponding to the positioning pin 281 and upper tube 131 of the main fork 13 is a positioning hole 1310 at position with respect to the positioning pin 281. Thereby, the positioning pin 281 may be inserted into the through hole 150 and the positioning hole 1310 so that the monocycle can not rotate. Moreover, the folding edge of the half cylinder 261 and the lower edge of the positioning block 27 have respective positioning tips 2613, 271. The main sleeve 15 has positioning notches 151, 152 at positions corresponding to the two positioning tips 2613, 271. Thereby, when the clamping seat 26 at the distal end of the frame tube 24 clamps the main sleeve 15 of the monocycle 1. The two positioning tips 2613, 271 will buckle the two positioning notches 151, 152 so as to provide a correct and preferrable buckling effect.

The present invention has the following advantages for those studying to drive a monocycle.

1. The study process can be performed by three stages. The first stage is to engage the monocycle and the auxiliary body and the positioning device is buckled with the positioning pin so that the auxiliary body is firmly secured to the monocycle and the monocycle can not rotate. The second stage is to release the positioning pin so that the driver may train the balance ability for operating a monocycle. The third stage is that the auxiliary body is detached.

2. The monocycle can be driven toward a backward direction.

3. The front and rear wheels can rotate through 360 degrees. The monocycle has a main sleeve which is connected to the auxiliary body so that the monocycle may rotate through 360 degrees. The front portion may also rotate through 360 degrees.

Figure 6:
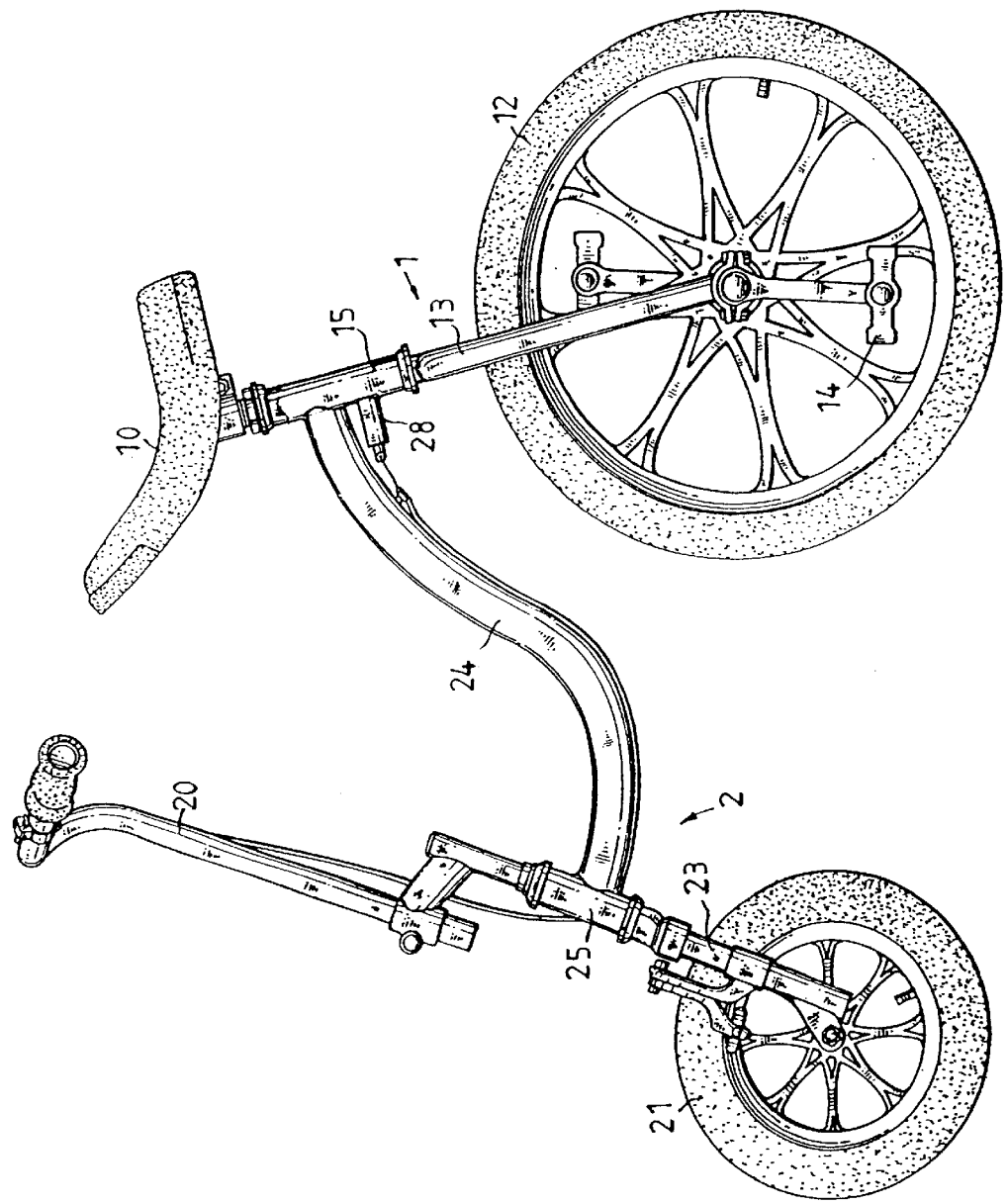
FIG. 6 is lateral schematic view of the welding way of the present invention.
Figure 7:
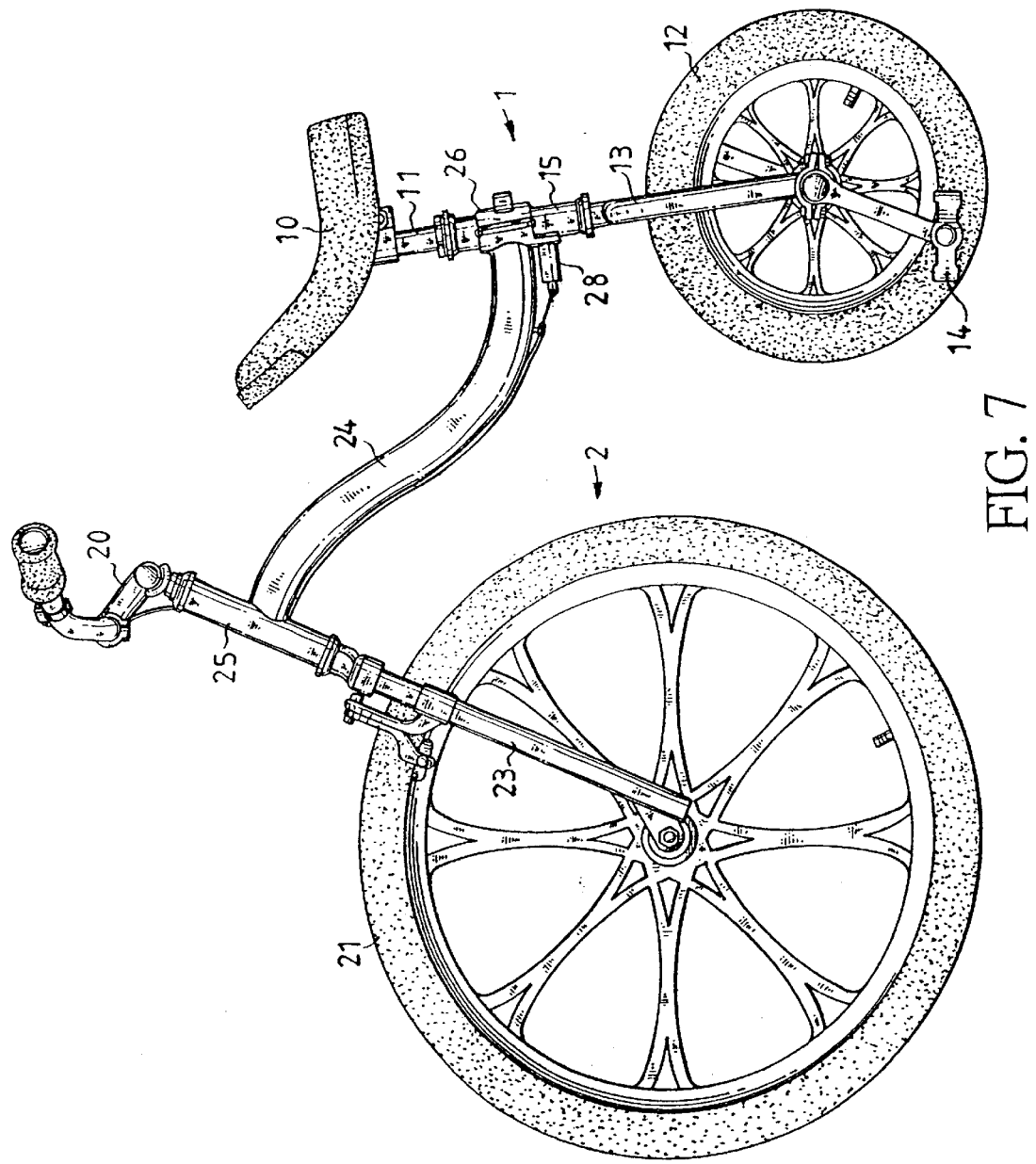
FIG. 7 is a lateral cross sectional view of another embodiment of the present invention.

Furthermore, referring to FIG. 6, the monocycle of the present invention can be welded directly with the auxiliary body.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An auxiliary device of a monocycle having an auxiliary body connected to a monocycle, wherein the monocycle has a main fork; and the main fork has a main sleeve; a detachable auxiliary body is connected to the main sleeve; thereby, the auxiliary body can be installed to or detachable from the monocycle; the auxiliary body is mainly formed by a front head and a frame tube; the front head having a handle frame, a sub-wheel body and a sub-fork; the frame tube is connected to the monocycle; a front end of the monocycle is installed with a sub-sleeve which is formed at an upper end of the sub-fork so as to be formed as a monocycle with an auxiliary wheel.

2. The auxiliary device of a monocycle as claimed in claim 1, wherein a distal end of the frame tube is installed with a clamping seat, and the clamping seat is locked to the main sleeve of the monocycle.

3. The auxiliary device of a monocycle as claimed in claim 2, wherein the clamping seat is formed by two half cylinders which are pivotally connected to one another.

4. The auxiliary device of a monocycle as claimed in claim 3, wherein each of the half cylinders has an end formed with a safety device; an upper and a lower end of one half cylinder have respective openings; an elastic strip passes through the two openings, two ends of the elastic strip are sealed by positioning nuts; an upper and a lower end of another half cylinder are formed with respective buckling pieces corresponding to the openings; and each buckling piece has a buckling hole.

5. The auxiliary device of a monocycle as claimed in claim 2, wherein a lower end of the clamping seat has a position device for fixing the monocycle so that the monocycle can not rotate.

6. The auxiliary device of a monocycle as claimed in claim 5, wherein the positioning device has an outer sleeve and the outer sleeve has a positioning pin and a positioning block for retaining the outer sleeve; in normal condition, a spring is biased against the positioning pin; the positioning block is welded to a lower edge of a half cylinder of the clamping seat; the positioning pin is engaged with a through hole of the main sleeve and a positioning hole of the main fork so that the monocycle can not be rotated.

7. An auxiliary device of a monocycle having an auxiliary body connected to a monocycle, wherein the monocycle has a main fork; and the main fork has a main sleeve; the auxiliary body is connected to the main sleeve; the auxiliary body is mainly formed by a front head and a frame tube; the front head having a handle frame, a sub-wheel body and a sub-fork; the frame tube is connected to the monocycle; a front end of the monocycle is installed with a sub-sleeve which is formed at an upper end of the sub-fork; and a rear end of the auxiliary body is welded to the main sleeve of the monocycle so as to be formed as a monocycle with an auxiliary wheel.

8. The auxiliary device of a monocycle as claimed in claim 7, wherein at a portion at the frame tube being welded to a lower end of the main sleeve of the monocycle is installed with a positioning device for fixing the monocycle so that the monocycle can not rotate.

9. The auxiliary device of a monocycle as claimed in claim 8, wherein the positioning device has an outer sleeve and the outer sleeve has a positioning pin; in normal condition, a spring is biased against the positioning pin; and the positioning pin is engaged with a through hole of the main sleeve and a positioning hole of the main fork so that the monocycle can not be rotated.

* * * * *